United States Patent
Bru-Magniez et al.

(10) Patent No.: US 6,750,298 B1
(45) Date of Patent: Jun. 15, 2004

(54) SURFACTANT COPOLYMERS BASED ON METHYLIDENE MALONATE

(75) Inventors: Nicole Bru-Magniez, Paris (FR); Virginie Larras, Sierentz (FR); Gérard Riess, Mulhouse (FR); Pascal Breton, Tigy (FR); Patrick Couvreur, Villebon sur Yvette (FR); Claude Roques-Carmes, Besancon (FR)

(73) Assignee: Virsol, Paris (FR)

( * ) Notice: Subject to any disclaimer, the term of this patent is extended or adjusted under 35 U.S.C. 154(b) by 0 days.

(21) Appl. No.: 09/600,895

(22) PCT Filed: Jan. 29, 1999

(86) PCT No.: PCT/FR99/00185

§ 371 (c)(1), (2), (4) Date: Sep. 19, 2000

(87) PCT Pub. No.: WO99/38898

PCT Pub. Date: Aug. 5, 1999

(30) Foreign Application Priority Data

Jan. 29, 1998 (FR) .............................. 98 01001

(51) Int. Cl.$^7$ .................. C08F 122/14; C08F 267/06; C08F 297/02; C08G 65/332; C08G 81/02
(52) U.S. Cl. .................. 525/404; 516/77; 525/279; 525/280; 525/294; 525/296; 525/299; 525/303; 525/329.5; 525/409
(58) Field of Search .................. 516/77; 525/279, 525/280, 294, 296, 299, 303, 329.5, 404, 409

(56) References Cited

U.S. PATENT DOCUMENTS 6,106,807 A * 8/2000 Albayrak et al. ........... 424/9.52
6,211,273 B1 * 4/2001 Bru-Magniez et al. ...... 524/365

FOREIGN PATENT DOCUMENTS

| EP | 583955 | 2/1994 |
| FR | 2722411 B1 * | 10/1996 |
| FR | 2789314 A1 * | 8/2000 |
| WO | 96/25954 | 8/1996 |

OTHER PUBLICATIONS

Chemical abstracts accession No. 1994:587250, Lescure et al., Pharm. Res. (1994), vol. 11, No. 9, pp. 1270–1277.*
Chemical abstracts accession No. 1995:929152, Breton et al., NATO ASI Ser., Ser. A (1994), 273, pp. 161–172.*
Chemical abstracts accession No. 1998:339420, Breton et al., Biomaterials (1998), vol. 19, Nos. 1–3, pp. 271–281.*
Derwent accession No. 1996–412497 for PCT WO 96 25954 and U.S. 6,106,807, Albayrak et al.*
Chemical abstracts registry No. 106392–12–5, Poloxamer and Pluronic F 68 polyoxyethylene block polymer.*

* cited by examiner

*Primary Examiner*—Robert Sellers
(74) *Attorney, Agent, or Firm*—Dennison, Schultz, Dougherty & MacDonald

(57) ABSTRACT

The invention generally concerns a novel family of biocompatible surfactant copolymers having a wide range of uses, in particular in pharmaceutics and for synthesizing substances in dispersed state and for surface treatment of materials or biomaterials. Said copolymers are characterised in that they comprise a hydrophobic sequence constituted by: either a homopolymer consisting of recurrent units corresponding to the general formula (I):

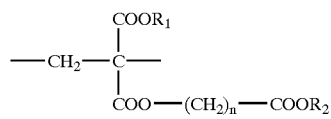

in which: $R_1$ represents a $C_1$–$C_6$ alkyl group or a $(CH_2)_m$—$COOR_3$ group wherein m is an integer between 1 and 5 and $R_3$ represents a $C_1$–$C_6$ alkyl group; $R_2$ represents a $C_1$–$C_6$ alkyl group; and n is an integer between 1 and 5; or a random copolymer consisting of different recurring units corresponding to formula (I) as defined above; or finally a random copolymer consisting for the major part of units corresponding to formula (I) as defined above.

12 Claims, No Drawings

SURFACTANT COPOLYMERS BASED ON METHYLIDENE MALONATE

BACKGROUND OF THE INVENTION

The present invention generally relates to a novel family of biocompatible surfactant copolymers having a large spectrum of uses, notably in the pharmaceutical field, and for synthesizing materials in the dispersed state, as well as treating the surface of materials and biomaterials.

More particularly, the object of the present invention is surfactant biocompatible copolymers comprising one or more sequences having hydrophobic character which are constituted mainly of recurring units or non-recurring units of general formula defined below, in particular forming a poly(methylidene malonate).

Surfactant copolymers formed from one or more sequences having a hydrophilic character and one or more sequences having a hydrophobic character have been known for a long time.

In particular, the products constituted of polyoxyethylene sequences having hydrophilic character and polyoxypropylene sequences having hydrophobic character and marketed under the designation PLURONIC® are commonly used for preparing compositions for cosmetic or pharmaceutical use.

The main drawback of these copolymers comes from the fact that they comprise no biodegradable sequence.

Surfactant copolymers comprising biodegradable sequences have already been described for example in the EP 583 955 document. These are block copolymers which contain ethylene oxide units and units derived from amino acids, as hydrophobic sequences.

The biodegradability of these known copolymers is accompanied by a cleavage of the main chain.

SUMMARY OF THE INVENTION

It has been discovered, and this constitutes the basis of the present invention, a novel family of biocompatible surfactant copolymers which are biodegradable via a mechanism of bio-erosion which does not significantly modify the degree of polymerisation of said copolymer.

More specifically, the copolymers in accordance with the invention can degrade chemically or biochemically by cleavage of the lateral substituents constituting the sequences having hydrophobic character, and this bio-erosion is advantageously accompanied by the passage of a copolymer having the characteristics of a surfactant into an entirely hydrophilic copolymer of the same degree of polymerisation as the staring polymer.

The copolymers in accordance with the present invention have very many advantages over the surfactant copolymers known to date, these advantages result from the particular chemical structure of their sequences having hydrophobic character.

These sequences notably enable providing copolymers which have various structures, block structures or grafted structures, it being difficult for the latter structures to be accessible in the case of the copolymers described for example in the EP 583 955 document.

The high reactivity, in anionic polymerisation as well as in radical polymerisation, of the monomers used for preparing these sequences having hydrophobic character, facilitates adjusting the molecular masses of these sequences, and, consequently, the properties of the copolymers.

Finally, the copolymers in accordance with the present invention have, according to the chemical structure of their sequences having hydrophobic character, various degradation kinetics and are therefore suitable for a large range of applications.

DETAILED DESCRIPTION OF THE INVENTION

Thus, according to a first aspect, the present application aims to cover biocompatible copolymers of the type comprising at least one sequence having a hydrophilic character and at least one sequence having a hydrophobic character, characterised in that said sequence having hydrophobic character is formed:

either from a homopolymer constituted of recurring units of the following general formula (I):

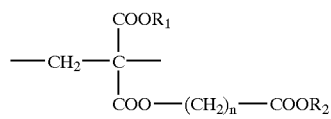

in which:
R$_1$ represents an alkyl group having 1 to 6 carbon atoms or a (CH$_2$)$_m$—COOR$_3$ group in which m is an integer between 1 and 5 and R$_3$ represents an alkyl group having 1 to 6 carbon atoms;
R$_2$ represents an alkyl group having 1 to 6 carbon atoms; and
n is an integer between 1 and 5;
or from a random copolymer constituted of different recurring units of formula (I) as defined above;
or, finally, from a random copolymer constituted mainly of units of formula (I) as defined above.

Advantageously, the above-mentioned sequence having hydrophobic character will be formed from a homopolymer constituted of recurring units of formula (I) as defined above.

Without leaving the context of the present invention, this sequence having hydrophobic character can also be formed from a random copolymer constituted of different recurring units of formula (I) as defined above, or even from a random copolymer constituted mainly of units of formula (I) as defined above, i.e. constituted of at least 50%, expressed in molar proportions, of such units, it being possible for the other units to be formed from malonic, vinylic, or acrylic monomers which are copolymerisable with the methylidene malonate units of formula (I).

According to a currently preferred embodiment of the invention, the above-mentioned sequence having hydrophobic character is constituted of recurring units of the above-mentioned general formula (I) in which:
R$_1$ represents an alkyl group having 1 to 6 carbon atoms;
R$_2$ represents an alkyl group having 1 to 6 carbon atoms; and
n is a number equal to 1.

According to a particularly preferred embodiment of the invention, the above-mentioned sequence having hydrophobic character is formed from a homopolymer constituted of recurring units of formula:

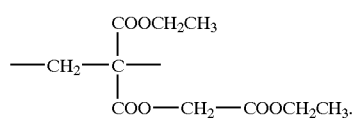

According to a particular characteristic, the sequence having hydrophilic character of the biocompatible copolymers in accordance with the present invention is selected from a poly(oxyethylene), a poly(vinyl alcohol), a poly (vinylpyrrolidone), a poly(N-2 hydroxypropyl methacrylamide), a poly(hydroxyethyl methacrylate), a hydrophilic poly(amino acid) such as a polylysine, a polysaccharide, and will preferably be constituted of a poly(oxyethalene).

The copolymers in accordance with the present invention can have various structures, block structures or grafted structures.

These copolymers may generally be characterised:
  by a content by weight of sequences having hydrophobic character of between 5 and 95%, preferably of between 10 and 90%;
  by a total molar mass of the sequences having hydrophobic character between 1,000 and 80,000 g/mol, and preferably between 1,000 and 50,000 g/mol.

The copolymers in accordance with the present invention can be prepared by classical polymerisation techniques well known to the person skilled in the art.

Amongst these techniques, anionic polymerisation, radical polymerisation, or even the technique of coupling the precursor sequences of the copolymer, will preferably be used, these sequences having been adequately functionalised beforehand on the chain end.

The anionic polymerisation is more particularly suitable for preparing block copolymers.

The anionic copolymerisation comprises the sequential addition of the monomers and enables obtaining copolymers of perfectly defined structure, the amounts of initiators and monomers engaged enabling controlling the degree of polymerisation of each of the sequences.

Thus, a block copolymer can be obtained:
  either by anionic polymerisation of a first monomer and reaction of the growing chain with a second monomer;
  or by activation of a precursor polymer which will act as initiator for the polymerisation of a second monomer.

The initiator agents which can be used within the context of these anionic polymerisations will generally be:
  on the one hand, organometallic derivatives, such as butyllithium, and diphenylhexyllithium in particular;
  on the other hand, alkoxides, and in particular macromolecular alkoxides, such as POE alkoxide, which can be generated by activation of a hydroxy function with the aid of cumylpotassium, diphenylmethylpotassium, or naphthalenepotassium.

The anionic polymerisation will generally be carried out in a solvent which is compatible with the various sequences of the copolymer.

In the case in which the sequence having hydrophilic character is constituted of a poly(oxyethylene) and the sequence having hydrophobic character is constituted of a poly(methylidene malonate), the block copolymers according to the invention will be prepared preferably by successive anionic polymerisation of the ethylene oxide and then of the methylidene malonate, or by activation of a commercial monohydroxylated polyoxyethylenated precursor and subsequent anionic polymerisation of the poly(methylidene malonate) sequence.

Generally, tetrahydrofuran will preferably be used as polymerisation solvent, this product enabling working in a homogeneous environment and favourably influencing the polymerisation kinetics.

As regards the starting monomers, it will be possible for the methylidene malonates to be prepared for example by following the method described in the EP 283 346 patent which corresponds to U.S. Pat. Nos. 4,931,584 and 5,142,098 patents, which are incorporated herein by reference, and the methylidene malonates will generally be degassed, under vacuum of a pallet pump, to constant weight in order to remove the polymerisation inhibitor ($SO_2$).

The monomers used for preparing the hydrophilic sequences will generally be commercial products.

The coupling technique is also more particularly suitable for preparing block copolymers.

This reaction is generally carried out from pre-synthesised and functionalised homopolymers, in the presence of a coupling agents and optionally in the presence of an activating agent, in a suitable solvent.

An $\alpha$-carboxy group-functionalised poly(oxyethylene) homopolymer and an $\alpha$-hydroxy group-functionalised poly(methylidene malonate)homopolymer will advantageously be used in the case of the preparation of the preferred copolymers according to the invention, the hydrophilic sequence of which is constituted of a poly(oxyethylene) and the hydrophobic sequence of which is constituted of a poly(methylidene malonate).

The $\alpha$-carboxy group-functionalised poly(oxyethylene) homopolymer can be obtained for example by transforming a commercial $\alpha$-hydroxy group-functionalised poly(oxyethylene) with succinic anhydride.

The $\alpha$-hydroxy group-functionalised poly(methylidene malonate)homopolymer can be obtained directly by anionic synthesis in aqueous medium or by anionic synthesis in a solvent using an aqueous sodium hydroxide solution as polymerisation initiator.

Dicyclohexylcarbodiimide (DCCI) will advantageously be used as coupling agent which is particularly adapted to this polymerisation.

The coupling reaction can optionally be activated by basic catalysis, and will generally take place in a solvent which is compatible with the homopolymers, such as dichloromethane in the particular case of the preferred copolymers of the invention.

The radical polymerisation is more particularly suitable for preparing grafted copolymers.

This polymerisation is generally carried out from a macromonomer, i.e. an oligomer which bears, on one of its ends, an ethylenic group which is radical polymerisable and which is able to react with a monomer to form a copolymer having a grafted structure.

This polymerisation will generally be carried out in the presence of an initiator in a suitable solvent.

It will be possible for various functionalised macromonomers to be used in the case of the preparation of the preferred copolymers of the invention, the hydrophilic sequence of which is constituted of a poly(oxyethylene).

It will be more particularly preferred to use a methacryloyl group-functionalised poly(oxyethylene) macromonomer.

Such a product can be commercial (Aldrich) and will be constituted for example by a poly(oxyethylene) chain of molar mass between 308 and 440 g/mol, or will be prepared from a commercial poly(ethylene glycol)monomethylether by coupling with methacrylic acid in dichloromethane to form a methoxy terminal function.

Such a macromonomer may even be prepared by activation of a poly(oxyethylene) and subsequent reaction with methacryloyl chloride.

It is also be possible for the copolymers having grafted structures according to the invention to be prepared by transesterification of a poly(oxyethylene) monomethylether with the lateral ester chains of pre-synthesised poly(methylidene malonate).

This transesterification will generally be carried out with alcohol in the presence of a catalyst at high temperature.

In general, the copolymers in accordance with the present invention have a large range of applications as surfactants.

These copolymers enable in particular reducing the surface tension of water and the interfacial tension of a water/non-water-immiscible organic solvent system.

These copolymers even enable preparing micellar systems in aqueous media which are especially useful as vectors for active principles.

These copolymers also enable preparing or stabilising simple water-in-oil or oil-in-water type emulsions.

These copolymers even enable encapsulating various active substances, particularly substances of therapeutic use.

The copolymers in accordance with the present invention even find application as colloid protectors for stabilising nanoparticles.

They will be particularly useful when these particles are prepared from polymers comprising recurring units which are identical to those of their sequences having a hydrophobic character, and this facilitates, as is understood, the anchoring of the copolymer onto the surface of these particles while at the same time conferring a biocompatible and hydrophilic character to them by virtue of the presence in said copolymer of at least one biocompatible hydrophilic sequence.

The copolymers in accordance with the invention can also be used as agents for treating the surface of materials or biomaterials, particularly for conferring a hydrophilic character to the treated surfaces by anchoring of said copolymers, or for minimising the interfacial adhesion with animal tissues, cells or biomolecules, when these materials or biomaterials are susceptible in coming into contact with said cells or biomolecules.

The copolymers in accordance with the present invention can also be used for preparing particles which can be used as contrast agents.

The copolymers in accordance with the present invention can even be used as biocompatible materials, for example in the form of films or moulded pieces, as well as for treating the surface of implant structures, and for minimising or favouring interfacial adsorption mechanisms.

The present invention will now be illustrated by the following non-limiting Examples. In these Examples, the following abbreviations are used:

EO: ethylene oxide
POE: poly(oxyethylene)
MM 2.1.2: methylidene malonate of formula:

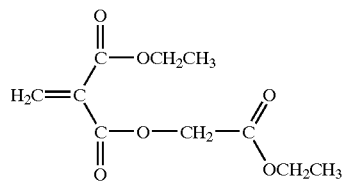

also designated as: 1-ethoxycarbonyl-1-ethoxycarbonylmethyl-eneoxycarbonyl-ethene MM 2.3.2: methylidene malonate of formula:

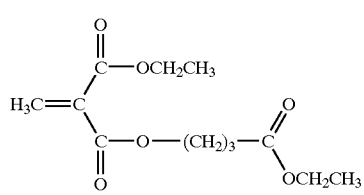

MM 3.3: methylidene malonate of formula:

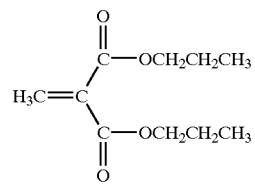

PMM 2.1.2: polymer consituted of recurring monomer units of formula

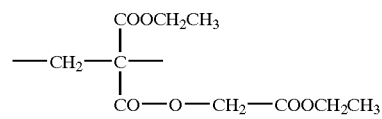

PMM 2.3.2: polymer consituted of recurring monomer units of formula:

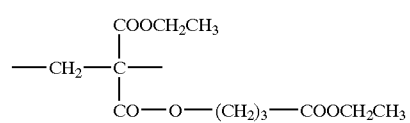

PMM 3.3: polymer consituted of recurring monomer units of formula

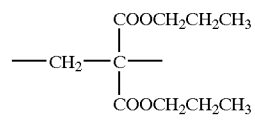

THF: Tetrahydrofuran
P.I.: Polymolecularity index
DCCI: Dicyclohexylcarbodiimide
DMAP: Dimethylaminopyridine
PEG: Polyethylene glycol

EXAMPLE 1

Preparation of a Block Copolymer According to the Invention Anionically

A POE-PMM 2.1.2 block copolymer was obtained by successive polymerisation of the two monomers starting with the preparation of the POE block, using the following experimental protocol.

The reactor in which the polymerisation is carried out (250 ml) is connected to a vacuum line which enables working under high vacuum and which gets rid of protic impurities.

The solvent (THF, 150 ml), purified of all traces of humidity, is cryo-distilled into the reactor at −70° C.

The initiator (potassium tert-butoxide (0.1N/THF); 10 ml) is then added with the aid of a syringe via septum.

Ethylene oxide (5 g) is then introduced by cryodistillation.

The polymerisation is carried out at ambient temperature for 48 hours. After this time, a sample enables monitoring, by gel permeation chromatography, the molar mass (4,000 g/mol) and the polymolecularity index (1.13) of the first sequence.

MM 2.1.2 (0.5 ml), freshly degassed under vacuum in order to remove the $SO_2$ used as polymerisation inhibitor, is then added rapidly in one batch at ambient temperature.

After 5 hours, the copolymer is deactivated by the addition of methanol and is precipitated in diethyl ether.

5 motifs derived from MM 2.1.2 are fixed onto the POE, and this corresponds to a molar mass for the PMM 2.1.2 of 1,150 g/mol.

A thermal analysis of the copolymer shows a glass transition temperature of −16° C. as well as a melting peak of 45° C. (ΔH=117 J/g).

EXAMPLE 2

Preparation of Block Copolymers According to the Invention Anionically

The experimental protocol is the same as that described for Example 1.

The following reagents are used:
Solvent: THF 100 ml
Ethylene oxide (EO): 3 g
Initiator: diphenylmethylpotassium (0.25 N/THF): 3 ml
MM 2.1.2: either 2 ml or 3.2 ml The POE synthesised has a molar mass of 3,600 g/mol (P.I.=1.12).

The addition of the second sequence at ambient temperature leads to a copolymer of final molar mass of 5,900 g/mol (for 2 ml of monomer added) and 9,300 g/mol (for 3.2 ml of monomer added), i.e. having incorporated 10 and 25 MM 2.1.2 motifs respectively, and this corresponds to a total molar mass for the PMM 2.1.2 of 2,300 and 5,750 g/mol respectively.

A thermal analysis of the copolymer enables showing the glass transition temperature of the copolymer which is −18° C. for the first copolymer and 6° C. for the second copolymer respectively, as well as a melting peak at the respective temperatures of 33° C. and 39° C. (ΔH of 53 and 63 J/g).

EXAMPLE 2A

Preparation of a Block Copolymer According to the Invention Anionically

In this example, a copolymer according to the invention was prepared the hydrophobic sequence of which is formed from a random copolymer constituted of different units.

The experimental protocol is the same as that described for Examples 1 and 2.

The following reagents were used:
Solvent: THF, 100 ml
Ethylene oxide (EO): 4 g
Initiator: diphenylmethylpotassium (0.35M/THF): 2.9 ml
MM 2.1.2: 1.5 ml
MM 3.3: 3 ml.

The POE, synthesised in the manner already described in the preceding Examples, has a molar mass of 11,000 g/mol (P.I.=1.11).

The mixture of the two monomers (MM 2.1.2 and MM 3.3) freshly degassed under vacuum is then rapidly added at ambient temperature onto the alkoxide function of the POE block.

After deactivation, the copolymer is precipitated in diethyl ether.

It is separated from the ethereal solution by centrifugation.

The NMR and GPC analyses indicate a percentage by weight of 23.6% for the MM 2.1.2 (25 motifs) and 30.6% for the MM 3.3 (36 motifs) respectively.

A thermal analysis of this copolymer shows the melting temperature of the POE at 58° C. (ΔH=61 J/g) and one sole glass transition temperature at 11° C.

EXAMPLE 2B

Preparation of Block Copolymers According to the Invention Anionically

The experimental protocol is similar to that described for Example 2A.

The following reagents were used:
Solvent: THF, 150 ml
Ethylene oxide (EO): 3 g
Initiator: diphenylmethylpotassium (0.35M/THF): 3 ml
Hydrophobic monomers: MM 2.1.2: 2 ml and MM 3.3: 1 ml or MM 2.1.2: 2 ml and MM 3.3: 2 ml The first sequence synthesised, the POE, has a molar mass of 9,500 g/mol (P.I.=1.03).

The mixture of the two monomers is added onto the alkoxide function of the POE.

After precipitation and recovery of the copolymer, its final composition is determined by NMR analysis.

In the case of the mixture (MM 2.1.2/MM 3.3; 2/1), the percentage by weight of MM 2.1.2 incorporated is 32.2% (27 motifs) and that of MM 3.3 is 19.4% (19 motifs).

In the case of the mixture (MM 2.1.2/MM 3.3; 2/2), the percentage by weight of MM 2.1.2 incorporated is 29.6% (29 motifs) and 27.6% of MM 3.3 (30 motifs).

EXAMPLE 2C

Preparation of a Block Copolymer According to the Invention Anionically

The experimental protocol is the same as that described for Examples 1 and 2.

The following reagents were used:
Solvent: THF 100 ml
Ethylene oxide (EO): 3 g
Initiator: diphenylmethylpotassium (0.32M/THF): 2.7 ml
MM 2.3.2: 2 ml The POE, synthesised in a classical manner has a molar mass of 3,500 g/mol (P.I.=1.10).

The addition of the second monomer, diluted beforehand in a few ml of anhydrous THF, is then rapidly added to the alkoxide at ambient temperature and leads to a copolymer incorporating 5 MM 2.3.2 motifs corresponding to a molar mass for the PMM 2.3.2 of 1,290 g/mol.

EXAMPLE 2D

Preparation of Block Copolymers According to the Invention Anionically

The experimental protocol is the same as that described for Examples 2A and 2B.

The following reagents were used:
Solvent: THF 100 ml
Ethylene oxide (EO): 4 g
Initiator: diphenylmethylpotassium (0.4M/THF): 2.5 ml
MM 2.1.2: 1.5 ml
MM 2.3.2: 2 ml The POE, synthesised in the manner already described in the preceding Examples, has a molar mass of 11,000 g/mol (P.I.=1.11).

The mixture of the two monomers (MM 2.1.2 and MM 2.3.2) freshly degassed under vacuum is then rapidly added at ambient temperature onto the alkoxide function of the POE block.

After deactivation, the copolymer is precipitated in diethyl ether.

The NMR and GPC analyses indicate a percentage by weight of 7% for the MM 2.1.2 (4 motifs) and 13% for the MM 2.3.2 (7 motifs) respectively.

EXAMPLE 3

Preparation of a Block Copolymer According to the Invention Anionically.

A POE-PMM 2.1.2 copolymer was obtained by re-initiation of a preformed POE precursor of determined length, and then by reaction of the alkoxide obtained with methylidene malonate, by the implementation of the following protocol:

Monohydroxylated PEG (PEG monomethylether ALDRICH Mn=2,000 g/mol: 1.2 g) is dried under high vacuum in a polymerisation reactor connected to a vacuum line.

100 ml of anhydrous THF are cryo-distilled onto the polymer placed at −70° C.

The temperature is then increased progressively to 20° C. in order to allow the solubilisation of the polymer.

The just amount of the organolithium (Diphenylhexyllithium (0.056 M in THF): 10.7 ml) is then added dropwise, via septum, into the reactor.

The solution decolourises almost instantaneously and after the addition, the solution is pale yellow and attests the presence of alkoxide anions.

After 3 hours of reaction, the MM 2.1.2 (3.7 g), freshly degassed under vacuum and diluted in 10 ml of anhydrous THF, is rapidly added into the reactor at ambient temperature. The medium decolourised in a few seconds.

After 5 hours of polymerisation, the copolymer is terminated by the addition of 5 ml of methanol. The reaction medium is concentrated, and then the polymer is recovered after precipitation in ether, washing with ether and drying under vacuum.

EXAMPLE 3A

Preparation of a Block Copolymer According to the Invention Anionically

A tri-block copolymer PMM 2.1.2-POE-PMM 2.1.2 was obtained by initiating a dihydroxylated POE precursor of pre-determined molar mass, then by reacting the dialkoxide obtained with methylidene malonate, using a protocol analogous to that of Example 3.

The following reagents were used:
Solvent: THF, 100 ml
Dihydroxylated POE (Fluka) 2,000 g/mol: 2 g
Initiator: diphenylhexyllithium (0. 145M/THF): 13.8 ml
MM 2.1.2: 3 ml.

The amount of organolithium added enables metallating the two hydroxylated ends of the POE and from this fact, it enables initiating and then polymerising the MM 2.1.2 sequence on both ends of the hydrophilic sequence.

5 hours after adding the MM 2.1.2, the polymerisation is ended by introducing 5 ml of methanol into the reaction mixture. After concentrating the reaction medium, the copolymer is recovered by re-precipitation in ether.

The final composition of MM 2.1.2 is 81.6% by weight in the copolymer, i.e. a succession of 19 MM 2.1.2 motifs, 45 EO motifs and then once again 19 MM 2.1.2 motifs.

EXAMPLE 4

Preparation of a Block Copolymer According to the Invention by Coupling Reaction A block copolymer according to the invention was obtained by a coupling reaction between an α-carboxy group-functionalised oxyethylenated homopolymer (Mn=5,000 g/mol) and an α-hydroxy group-functionalised MM 2.1.2 homopolymer.

The OH terminus of the α-hydroxy functionalised PMM 2.1.2 sequence can be obtained:
either by the synthesis of the polymer in aqueous medium (vide Lescure F. et al; Pharmaceutical Research, 11, 9, 1270–1276, 1994);

or by the use of an aqueous sodium hydroxide solution as initiator of the polymerisation of the MM 2.1.2 in a THF or acetone medium.

One equivalent of each one of the homopolymers is dissolved in dichloromethane; one equivalent of DCCI and 0.3 equivalent of DMAP in solution in dichloromethane are then added.

After 10 hours of reaction at ambient temperature, the characteristic cloudiness of the dicyclohexylurea (DCHU) is removed by filtering.

The mixture is then washed with acid (removal of the residual DCHU and DMAP) and then neutralised with a solution of sodium carbonate.

The copolymer is then obtained by precipitation in water, non-solvent of the main sequence, namely PMM 2.1.2.

EXAMPLE 5

Preparation of a Grafted Copolymer According to the Invention Radically

A grafted copolymer according to the invention was obtained from the two following homopolymers:
PEG monomethylether ALDRICH (Mn=2,000 g/mol): 0.1 g
PMM 2.1.2 (Mn=30,000 g/mol): 0.27 g by following the experimental protocol described below.

The two dry homopolymers are dissolved in toluene.

The mixture is degassed under nitrogen and is heated to 60° C.

The catalyst (1-hexanol, 2-ethyl, titanate (4+) salt, Tyzor TOT (Du Pont)) diluted in a little toluene is then added to the reaction medium.

The synthesis is continued for 12 hours at 60° C.

The crude reaction is then concentrated and then re-precipitated in water in order to separate the copolymer and the non-transesterified PMM 2.1.2 from the non-fixed PEG.

EXAMPLE 6

Preparation of a Grafted Copolymer According to the Invention Radically

A grafted copolymer according to the invention was obtained from the two following products:
PEG methacrylate (macromonomer), Mn=2,000 g/mol: 0.71 g
MM 2.1.2: 0.62 g
In a three-necked flask are introduced the two comonomers as well as the solvent (THF, 30 ml).

The whole is heated to 40° C.

The initiator (cyclohexyl percarbonate (1% molar with respect to the total of the monomers engaged)) is then introduced in solution in THF.

The synthesis is continued for 18 hours at 40° C.

The reaction solvent is evaporated off and the copolymer formed is still mixed with a fraction of residual macromonomer.

Effectively obtaining the copolymer can be demonstrated by the technique of gel permeation chromatography and by the formation of micelles in aqueous medium.

EXAMPLE 6A

Preparation of a Grafted Copolymer According to the Invention by Transesterification A copolymer having a grafted structure PMM 2.1.2-POE was obtained by transesterification of a poly(oxyethylene)

monomethylether with the lateral ester chains of a pre-synthesised poly(methylidene malonate).

The following reagents were used:

Solvent: THF, 150 ml

PMM 2.1.2 (Mn=30,000 g/mol): 2 g

Initiator: diphenylhexyllithium (0.02M/THF): 3.3 ml

POE monomethylether Mn=2,000 g/mol: 0.15 g

The following protocol is used.

THF is freshly cryo-distilled into the polymerisation reactor at −70° C.

The diphenylhexyllithium is then introduced and the temperature is allowed to rise to about 15° C.

The POE monomethylether is then added. The decolouration of the initiator, dark red at the start, is immediate.

The PMM 2.1.2, synthesised anionically in THF at −70° C. and by also using diphenylhexyllithium as initiator is then introduced into the reactor in which the alkoxide is found.

After 3 hours of reaction, the polymerisation is stopped by adding 1 ml of methanol and the polymer is recovered after evaporation under vacuum of the reaction solvent.

EXAMPLE 7

Use of the Copolymers According to the Invention to Obtain Micelles in Water

Obtaining micelles in water after dialysis of a solution of copolymers in an initial mixture of THF/MeOH/H$_2$O of composition 2/1/1 by volume.

The aim of this Example is to demonstrate the surfactant properties of the POE-PMM 2.1.2 copolymers in water, by the formation of micelles which by themselves can constitute active principle vectors.

The dialysis is carried out across a membrane (SPECTRA POR ref 132 638, porosity 1,000 Daltons) which only permits an exchange of solvent and which prevents the copolymer from crossing it. The dialysis leads to a progressive enrichment of water inside the volume defined by the membrane.

The size of the resulting micelles is given in the following Table:

| Copolymers(*) no. EO unit/no. MM 212 unit | Concentration of the dialysed solution (g/l) | Average diameter in weight units (Dw) and standard deviation (SD) (expressed in nm) |
| --- | --- | --- |
| EO 84-MM 13 | 3.5 | Dw = 36.5 ± 0.4 SD = 7 |
| EO 84-MM 23 | 4.5 | Dw = 40.6 ± 0.1 SD = 5 |
| EO 114-MM 13 | 4.0 | Dw = 33.8 ± 1.4 SD = 12 |
| EO 114-MM 8 | 6.8 | Dw = 80.2 ± 3.2 SD = 24 |

(*)the copolymers are obtained according to the procedure described in Examples 1 and 2, EOx.MMy = copolymer possessing x EO motifs and y MM 2.1.2 motifs.

EXAMPLE 8

Use of the Copolymers According to the Invention for Stabilising a Water-in-oil Emulsion (W/O)

Emulsions are prepared by adding 1 ml of water into a solution of 10 ml of ethyl acetate containing a pre-determined amount of copolymer.

The mixture is emulsified for 5 minutes with the aid of an Ultra Turrax JANKE & KUNKEL T25 at a speed of 13,000 rpm.

The stability of the emulsions is evaluated visually with the aid of an optical device of the TURBISCAN MA 1,000 type.

A comparative example is carried out using a polymer of the PLURONIC® type.

The characteristics of the emulsions are given in the Table below:

| Copolymers* studied | % POE by weight | HLB according to GRIFFIN** | Sedimentation time of the emulsion (hours) |
| --- | --- | --- | --- |
| PLURONIC F68 (ref) | 80 | 16 | 24 |
| EO 91-MM* 3 | 85.3 | 17 | 40 |
| EO 114-MM* 10 | 68.5 | 14 | 50 |
| EO 114-MM* 13 | 62.6 | 12.5 | 170 |
| EO 84-MM* 13 | 55.3 | 11 | 400 |
| EO 84-MM* 23 | 41.1 | 8 | >450 |

(**)Empirical relationship of GRIFFIN (1954): HLB = 20 (molecular weight of the hydrophilic functions)/(total molecular weight).
(*)EOx.MMy = copolymer possessing x EO motifs and y MM 2.1.2 motifs, MM represents MM 2.1.2.

EXAMPLE 9

Measurement of the Surface Tension of Aqueous Solutions of PMM212-POE Copolymers With the aim of verifying the surfactant character of the copolymers synthesised, measurements of surface tension are made on aqueous solutions of copolymers of concentration 10 g/l, obtained by direct dissociation of the copolymer in water. The solutions are left to stand 12 hours before being studied.

The measurements are made at 20° C., with the aid of a TENSIMAT® n3 apparatus (Prolabo) using a platinum blade

| Solution | Surface tension (mN/m) |
| --- | --- |
| Pure water | 72 |
| Pluronic F68 | 46 |
| EO 114-MM 13* | 44 |
| EO 84-MM 13* | 40 |
| EO 84-MM 23* | 41 |

(*)no. EO unit/no. MM212 unit. The copolymers are obtained according to the method described in Examples 1 and 2.

EXAMPLE 10

Calculations of surface energies of copolymer films deposited on a glass blade, were carried out by wettability (osed drop method) with an NFT Communication apparatus (MONTS, France), by measuring the angle of contact O of liquids (pure water, Prolabo, ethylene glycol, formamide, glycerol, diiodomethane and 1-bromonaphthalene, Sigma-Aldrich) of known surface tension.

The results obtained are compared to those of a film of hydrophobic material, PMM 2.1.2.

| Material* | dispersiveγ ($\gamma^D$) | polarγ ($\gamma^P$) |
| --- | --- | --- |
| PMM 2.1.2 | 39 | 4.5 |
| EO 84-MM 13 | 39 | 11 |
| EO 114-MM 10 | 41 | 13 |
| EO 91-MM 3 | 42 | 13 |

(*)EOx-MMy: copolymer possessing x EO motifs and y MM 2.1.2 motifs.

It can be noticed that the component of the surface energy characteristic of the hydrophilicity, $\gamma^P$, increases with the percentage of EO in the various copolymers.

EXAMPLE 11

With the aim of verifying the biomolecule- or cell-adsorption inhibiting character of the copolymers according to the invention, calculations of surface energy by wettability (posed drop method) with an NFT Communication apparatus (MONTS, France) were carried out on dry copolymer films alone and after having been placed in contact of aqueous solutions of biomolecules (Chicken egg ovalbumin, Aldrich).

Each time, a comparison with a hydrophobic material, PMM 2.1.2, is carried out:

| Material* | Copolymers alone | | Copolymers in the presence of ovalbumin | |
|---|---|---|---|---|
| | dispersiveγ ($\gamma^D$) | polarγ ($\gamma^P$) | dispersiveγ | polarγ |
| PMM 2.1.2 | 39 | 4.5 | 40 | 15 |
| EO 84-MM 13 | 39 | 11 | 40 | 12 |
| EO 114-MM 10 | 41 | 13 | 42 | 10 |
| EO 91-MM 3 | 42 | 13 | 41 | 11 |

(*)EOx-MMy: copolymer possessing x EO motifs and y MM 2.1.2 motifs.

It is noticed that the increase in the percentage of ethylene oxide decreases the variations of the values of the components of the surface energy measured in the presence and in the absence of ovalbumin. The absorption level of the biomolecules on the copolymer film is thus lower.

EXAMPLE 12

Use of the Copolymers According to the Invention to Obtain Nanoparticles in Water The surfactant properties of the copolymers of the invention are here taken advantage of in order to enable stabilising hydrophobic PMM 2.1.2 particles of nanometric dimensions in aqueous medium. The nanoparticles are obtained by dispersion of 200 mg of PMM 2.1.2 polymer dissolved in 2 ml of acetone in an aqueous medium (10 ml distilled water) containing the POE-PMM 2.1.2 copolymer (36% MM 2.1.2 by weight) with good stirring.

The average diameters of the particles were determined with the aid of a Coultronics apparatus of the Coulter N4 type, at 20° C.

The results obtained are as follows:

| % of PMM 2.1.2-POE* | Average diameter of the particles (nm) |
|---|---|
| 0.5 | 161 +/− 40 |
| 1 | 220 +/− 60 |
| 2 | 240 +/− 70 |

(*)expressed in g per 100 ml of aqueous phase.

These results show that the copolymers in accordance with the invention possess surfactant properties which enable them to stabilise a suspension of nanoparticles in water in the absence of any other surfactant or colloid protector.

EXAMPLE 13A

Formulation of Nanoparticles of PMM 2.1.2 which Are Stabilised by a PMM 2.1.2-POE Copolymer According to the Invention, and which Are Loaded with Cyclosporin A The following experimental protocol was employed:
Polymerisation medium: Osmosed water pH 6.3=5 ml
Acetonic phase:
  MM 2.1.2=50 mg
  PMM 2.1.2-POE=100 mg
  Acetone=1 ml
Cyclosporin A: 5 mg of non-radiolabelled cyclosporin (cold)/500 μl ethanol and tritiated cyclosporin A (4.4 μCi)

The acetonic phase is dispersed in water under mechanical stirring (1,000 rpm). 30 minutes after the start of the polymerisation, the cold cyclosporin A/hot (radiolabelled) cyclosporin A mixture was added. The duration of the polymerisation is 18 hours.

The average diameter of the particles measured by means of a Nanosizer apparatus (Coultronics, France) is 206 nm+/−41 nm (average of 3 measurements).

The determination of the level of fixation of the cyclosporin A is carried out in the following manner:
Method: liquid scintillation counting (Beckman LS 6000 TA counter).
Scintillation liquid: Ultima Gold* (Packard).
Ultracentrifugation of 1 ml of the suspension at 140,000 g for 45 minutes.
Measurement of the radioactivity in 200 μl of supernatant and 200 μl of total suspension.

The level of fixation of the cyclosporin thus measured corresponding to the percentage of active principle found in the nanoparticles with respect to the amount initially introduced is 50%+/−3%

EXAMPLE 13B

Formulation of PMM 2.1.2 Nanoparticles which Are Stabilised by a PMM 2.1.2-POE Copolymer According to the Invention and which Are Loaded with Doxorubicin The following experimental protocol was used:
Polymerisation medium:
  Osmosed water pH 6.3=5 ml
  doxorubicin=4 mg
Acetonic phase:
  MM 2.1.2=50 mg
  PMM 2.1.2-POE=100 mg
  Acetone=1 ml Doxorubicin is dissolved in water. Then, the acetonic phase is dispersed in the aqueous phase under magnetic stirring (1,000 rpm). The duration of the polymerisation is 18 hours.

The average diameter of the particles measured by means of a Nanosizer apparatus (Coultronics, France) is 179 nm+/−28 nm (average of 3 measurements).

The determination of the level of encapsulation of the doxorubicin is carried out in the following manner:
Method: HPLC; C18 column; Mobile phase:Methanol/ethyl acetate/acetic acid: 70:28.7:1.3.
Ultracentrifugation of 1 ml of the suspension at 140,000 g for 45 min.
Determination of the concentration of doxorubicin in the total suspension and in the supernatant.

The level of encapsulation of the doxorubicin thus measured corresponding to the percentage of active principle found in the nanoparticles with respect to the amount initially introduced is 43%.

EXAMPLE 13C

Formulation of Nanoparticles of PMM 2.1.2 which Are Stabilised by a PMM 2.1.2-POE Copolymer According to the Invention and which Are Loaded with V3 Peptide/Ovalbumin Conjugate The following experimental protocol is used:
Polymerisation medium:
  Osmosed water pH 6.3=5 ml V3 peptide/Ovalbumin=1.15 mg and 0.6 mg respectively Acetonic phase:
MM 2.1.2=50 mg
PMM 2.1.2-POE=100 mg
Acetone=1 ml The V3 peptide/Ovalbumin conjugate is received in the form of an aqueous suspension in PBS at a concentration of 2.3 mg of peptide and 1.2 mg of ovalbumin per ml of suspension. The concentration of the conjugate in the suspension of nanoparticles is thus 0.23 mg of V3 peptide and 0.12 mg of ovalbumin per ml.

The acetonic phase is added into the aqueous phase under magnetic stirring (1,000 rpm). The duration of the polymerisation is 18 hours.

The average diameter of the particles measured by means of a Nanosizer apparatus (Coultronics, France) is 161 nm+/− 19 nm (average of 3 measurements).

The determination of the level of encapsulation of the V3 peptide/Ovalbumin conjugate is carried out in the following manner:

Method: HPLC with gradient on a C18 column after degradation of the nanoparticles and analysis of amino acids. Mobile phase A:$CH_3COONa$ 0.05M pH 5.1; Mobile phase B:Acetonitrile/Water (60:40); Detector UV: $\gamma$=254 nm.

Ultracentrifugation of 1 ml of the suspension at 140,000 g for 45 min.

HPLC on the residue of degradation of the total suspension and of the supernatant.

The level of encapsulation of the V3 peptide/Ovalbumin conjugate thus measured corresponding to the percentage of active principle found in the nanoparticles with respect to the amount initially introduced is 48%+/−3%.

GENERAL CONCLUSION

The nanoparticles of PMM 2.1.2 can thus be obtained in osmosed water pH 6.3, stabilised by at least 2% of PMM 2.1.2-POE copolymer. Under these operating conditions, it was possible for the active principles tested, which are cyclosporin A, doxorubicin and the V3 peptide/Ovalbumin conjugate, to be encapsulated.

What is claimed is:

1. Biocompatible copolymer comprising at least one sequence having a hydrophilic character and at least one sequence having a hydrophobic character, wherein said sequence having a hydrophobic character is selected from the group consisting of:

a homopolymer comprising recurring units of formula (I):

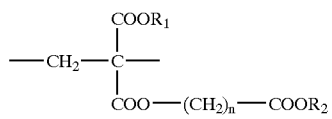

in which $R_1$ represents an alkyl group having 1 to 6 carbon atoms or a $(CH_2)_m$—$COOR_3$ group in which m is an integer between 1 and 5 and $R_3$ represents an alkyl group having 1 to 6 carbon atoms, $R_2$ represents an alkyl group having 1 to 6 carbon atoms, and n is an integer between 1 and 5;

a random copolymer comprising different recurring units of formula (I); and a random copolymer consisting essentially of units of formula (I).

2. The copolymer according to claim 1, wherein the sequence having a hydrophobic character comprises recurring units of formula (I) in which:

$R_1$ represents an alkyl group having 1 to 6 carbon atoms;

$R_2$ represents an alkyl group having 1 to 6 carbon atoms; and n is 1.

3. The copolymer according to claim 1, wherein the sequence having a hydrophobic character comprises recurring units of formula:

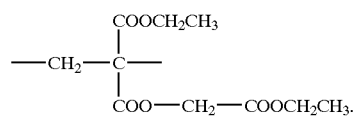

4. The copolymer according to claim 1, wherein the sequence having a hydrophilic character is selected from the group consisting of a poly(oxyethylene), a poly(vinyl alcohol), a poly(vinylpyrrolidone), a poly(N-2 hydroxypropyl methacrylamide), a poly(hydroxyethyl methacrylate), a hydrophilic poly(amino acid) and a polysaccharide.

5. The copolymer according to claim 3, wherein the sequence having a hydrophilic character is selected from the group consisting of a poly(oxyethylene), a poly(vinyl alcohol), a poly(vinylpyrrolidone), a poly(N-2 hydroxypropyl methacrylamide), a poly(hydroxyethyl methacrylate), a hydrophilic poly(amino acid) and a polysaccharide.

6. The copolymer according to claim 1, having a structure selected from the group consisting of a block structure and a grafted structure.

7. The copolymer according to claim 1, having a content by weight of the sequence having a hydrophobic character of between 5 and 95%.

8. The copolymer according to claim 1, having a content by weight of the sequence having a hydrophobic character of between 10 and 90%.

9. The copolymer according to claim 1, wherein the total molar mass of sequences having a hydrophobic character is between 1,000 and 80,000 g/mol.

10. The copolymer according to claim 1, wherein the total molar mass of sequences having a hydrophobic character is between 1,000 and 50,000 g/mol.

11. An agent for treating the surface of materials or biomaterials comprising the copolymer according to claim 1.

12. A process for preparing a composition selected from the group consisting of micellar systems and emulsions, comprising incorporating a biocompatible copolymer according to claim 1.

* * * * *